US010631152B2

(12) United States Patent
Okamoto (10) Patent No.: US 10,631,152 B2
(45) Date of Patent: Apr. 21, 2020

(54) WIRELESS COMMUNICATION SYSTEM, COMMUNICATION DEVICE, SENSOR DEVICE, AND WIRELESS COMMUNICATION METHOD (71) Applicant: KYOCERA CORPORATION, Kyoto (JP)

(72) Inventor: Tetsuo Okamoto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 12 days.

(21) Appl. No.: 16/137,377

(22) Filed: Sep. 20, 2018

(65) Prior Publication Data

US 2019/0028871 A1 Jan. 24, 2019

Related U.S. Application Data (63) Continuation of application No. PCT/JP2017/011246, filed on Mar. 21, 2017.

(30) Foreign Application Priority Data

Mar. 23, 2016 (JP) .................................. 2016-059054

(51) Int. Cl.
*H04W 76/30* (2018.01)
*H04W 76/10* (2018.01)
(Continued)

(52) U.S. Cl.
CPC ............ *H04W 4/80* (2018.02); *G06F 1/1698* (2013.01); *G08C 15/06* (2013.01); *G08C 17/00* (2013.01); *H04W 4/38* (2018.02); *H04W 52/0258* (2013.01); *H04W 68/005* (2013.01); *H04W 76/10* (2018.02); *H04W 76/30* (2018.02); *H04W 8/005* (2013.01); *H04W 52/0229* (2013.01); *H04W 84/18* (2013.01); *Y02D 70/10* (2018.01)

(58) Field of Classification Search
CPC combination set(s) only.
See application file for complete search history.

(56) References Cited

U.S. PATENT DOCUMENTS

2010/0331145 A1* 12/2010 Lakovic .................. G04F 10/00
482/8
2015/0126234 A1* 5/2015 Rodriguez ............. G08B 13/22
455/457

(Continued)

FOREIGN PATENT DOCUMENTS

JP 2013-233342 A 11/2013

*Primary Examiner* — Ganiyu A Hanidu
(74) *Attorney, Agent, or Firm* — Studebaker & Brackett PC (57) ABSTRACT

A wireless communication system includes: a sensor device configured to perform communications through short-range wireless communication; and a communication device configured to receive data transmitted from the sensor device, wherein when wireless communication is mutually disconnected, one of the communication device and the sensor device determines a predetermined reconnection condition and notifies an other of the communication device and the sensor device of the reconnection condition, and then the communication device and the sensor device mutually disconnect wireless communication, and when the communication device and the sensor device each satisfy the reconnection condition, the communication device and the sensor device restart mutually the communication.

19 Claims, 8 Drawing Sheets (51) Int. Cl.
*H04W 4/38* (2018.01)
*H04W 52/02* (2009.01)
*G08C 15/06* (2006.01)
*G06F 1/16* (2006.01)
*H04W 4/80* (2018.01)
*G08C 17/00* (2006.01)
*H04W 68/00* (2009.01)
*H04W 8/00* (2009.01)
*H04W 84/18* (2009.01)

(56) References Cited

U.S. PATENT DOCUMENTS

2016/0012205 A1* 1/2016 Saint .................. A61M 5/31528
604/154
2016/0165542 A1* 6/2016 Mori ..................... H04W 76/10
370/311
2017/0086253 A1* 3/2017 Kyou .................... H04L 67/303
2017/0245314 A1* 8/2017 Ohhira ................. H04W 76/14

* cited by examiner

WIRELESS COMMUNICATION SYSTEM, COMMUNICATION DEVICE, SENSOR DEVICE, AND WIRELESS COMMUNICATION METHOD

CROSS-REFERENCE TO RELATED APPLICATION

This application claims priority from International Patent Application No. PCT/JP17/011246 filed on Mar. 21, 2017, the entire subject matter of which is incorporated herein by reference.

TECHNICAL FIELD

This disclosure relates to a wireless communication system which communicates through short-range wireless communication, a communication device, a sensor device, and a wireless communication method.

BACKGROUND ART

In recent years, a wireless communication system which connects a plurality of communication devices through short-range wireless communication is increasingly used. As an example of using short-range wireless communication, an activity recording system including, as two communication devices, a sensor device for measuring a physical quantity, and a data storage terminal for storing data received from the sensor device, is developing. For example, in JP-A-2013-233342, an activity meter capable of performing short-range wireless communication is a sensor device, and a terminal such as a smart phone, etc. is a data storage terminal, and short-range wireless communication is performed therebetween. Accordingly, the activity meter and the smart phone are synchronized with each other, and an activity amount measured at the activity meter is stored in the smart phone.

SUMMARY

This disclosure provides a wireless communication system, a communication device, a sensor device, and a wireless communication method, which can reduce power consumption in short-range wireless communication by disconnecting and reconnecting short-range wireless communication without requiring an operation which is troublesome to a user.

A wireless communication system according to this disclosure includes: a sensor device configured to perform a short-range wireless communication; and a communication device configured to receive data transmitted from the sensor device, wherein when the short-range wireless communication is mutually disconnected, one of the communication device and the sensor device determines a predetermined reconnection condition and notifies an other of the communication device and the sensor device of the reconnection condition, after the notifying of the reconnection condition, the communication device and the sensor device mutually disconnect the short-range wireless communication, and when the communication device and the sensor device each satisfy the reconnection condition, the communication device and the sensor device restart mutually the short-range wireless communication.

Both the two communication devices may include a time acquisition unit, and the reconnection condition may be a predetermined time.

Both the two communication devices may include a sensor configured to measure a physical quantity, and the reconnection condition may be a predetermined physical quantity.

One of the two communication devices may be a sensor device configured to measure a physical quantity, and the other one may be a data storage terminal configured to store data received from the sensor device.

The two communication devices may be configured to perform the disconnection process when an amount of the stored physical quantity is not changed for a predetermined time.

In a wireless communication method of two communication devices which communicate with each other through short-range wireless communication according to this disclosure, one of the two communication devices determines a predetermined reconnection condition and notifies the other device of the reconnection condition, and then thereafter, disconnects mutual wireless communication, and the two communication devices determine a predetermined reconnection condition, respectively, and restart mutually communication when the reconnection condition is satisfied.

According to this disclosure, a wireless communication system, a communication device, a sensor device, and a wireless communication method, which can reduce power consumption in short-range wireless communication by disconnecting and reconnecting short-range wireless communication without requiring an operation which is troublesome to a user.

BRIEF DESCRIPTION OF THE DRAWINGS

The foregoing and additional features and characteristics of this disclosure will become more apparent from the following detailed descriptions considered with the reference to the accompanying drawings, wherein.

DESCRIPTION OF EMBODIMENTS

Hereinafter, preferred embodiments of this disclosure will be described in detail with reference to the accompanying drawings. Dimensions, materials, and other specific numerical values illustrated in exemplary embodiments are merely examples for easy understanding of the invention, and do not limit this disclosure unless otherwise specified. In the detailed description and the drawings, the same signs are used for components having substantially the same functions or configurations, and thus redundant explanation thereof is omitted, and also, components having nothing to do with this disclosure will not be illustrated.

Figure 1:
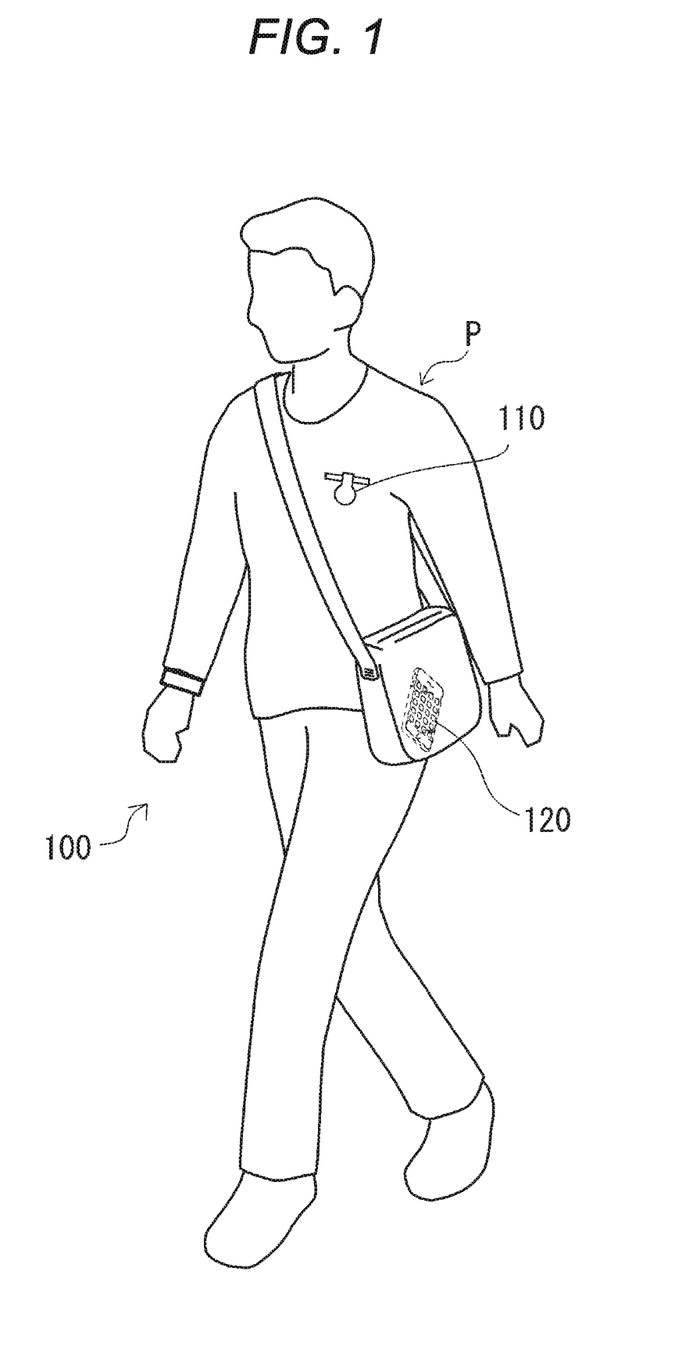
FIG. 1 is a view illustrating a wireless communication system according to the present exemplary embodiment.

FIG. 1 is a view illustrating a wireless communication system 100 according to the present exemplary embodiment. The wireless communication system 100 of the present exemplary embodiment includes two communication devices which communicate through short-range wireless communication. As shown in FIG. 1, in the present exemplary embodiment, one of the two communication devices is illustrated as a sensor device 110 measuring a physical quantity, and the other one is illustrated as a data storage terminal 120 (communication device) storing data received from the sensor device 110.

Specifically, as the sensor device 110, an activity meter which measures an activity amount of a user P as a physical quantity, and calculates a consumed calorie is illustrated. As the data storage terminal 120, a portable terminal such as a smart phone, etc. is illustrated. Accordingly, data of the activity amount of the user and the consumed calorie measured at the activity meter is transmitted to the potable terminal through short-range wireless communication, and is stored in the portable terminal. As examples of short-range wireless communication, Bluetooth (registered trademark), ZigBee (registered trademark), NFC (registered trademark), Felica (registered trademark), WiFi (registered trademark), or etc., may be used.

The above description is merely an example, and this disclosure may be applied to a sensor device such as a passometer (registered trademark), a heart rate meter, a sphygmomanometer, or etc., in addition to the activity meter, and a data storage terminal such as a note-type computer, a desktop type computer, a network disk, or etc., in addition to the portable terminal. Although the sensor device 110 and the data storage terminal 120 are illustrated as the two communication devices, this disclosure is not limited thereto, and can be applied to any communication devices that can perform mutual short-range wireless communication.

Figure 2A:
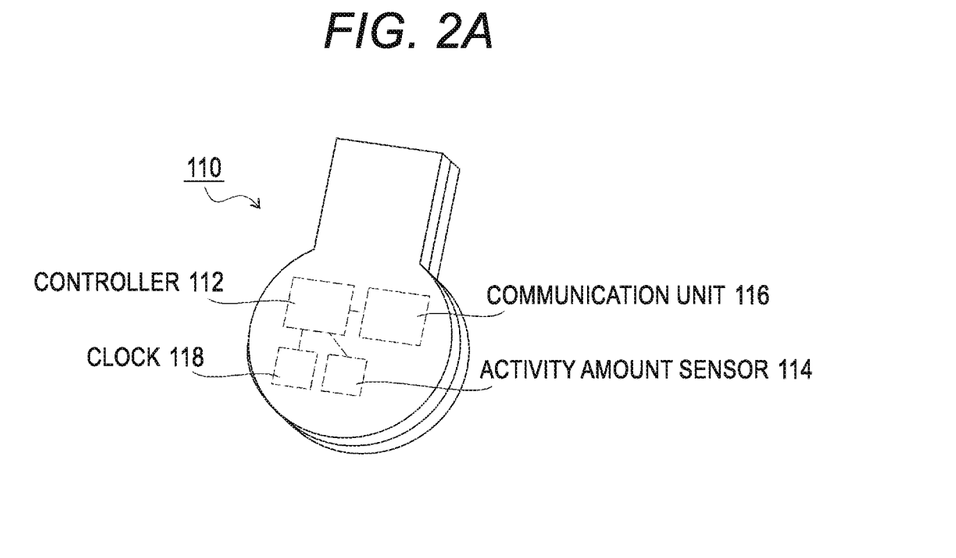
FIGS. 2A and 2B are views illustrating configurations of a sensor device and a data storage terminal, respectively.
Figure 2B:
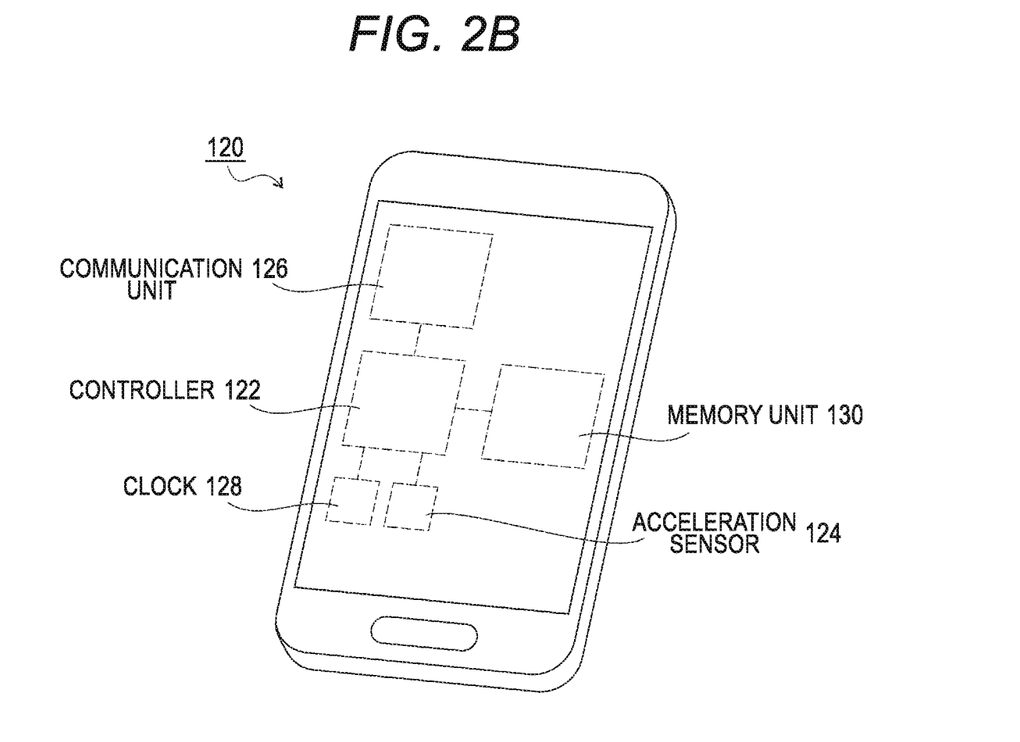

FIGS. 2A and 2B are views illustrating configurations of the sensor device 110 and the data storage terminal 120, respectively. FIG. 2A is a view illustrating the configuration of the sensor device 110, and FIG. 2B is a view illustrating the configuration of the data storage terminal 120.

The sensor device 110 includes a controller 112, an activity amount sensor 114, a communication unit 116, and a clock 118. The controller 112 is constituted by a semiconductor integrated circuit including a central processing unit (CPU), and manages and controls an overall operation of the sensor device 110. The activity amount sensor 114 measures an activity amount of the user P as a physical quantity. The communication unit 116 communicates with the data storage terminal 120 through short-range wireless communication. The clock 118 is a time acquisition unit and acquires a present time.

The data storage terminal 120 includes a controller 122, an acceleration sensor 124, a communication unit 126, a clock 128, and a memory unit 130. The controller 112 is constituted by a semiconductor integrated circuit including a central processing unit (CPU), and manages and controls an overall operation of the data storage terminal 120.

The acceleration sensor 124 measures acceleration as a physical quantity, and detects a posture of the data storage terminal 120. The communication unit 126 communicates with the sensor device 110 through short-range wireless communication. The clock 128 is a time acquisition unit and acquires a present time. The memory unit 130 is constituted by an internal ROM, a flash memory, an HDD, or etc., and stores a program or various data executed at the data storage terminal 120.

Hereinafter, operations of the sensor device 110 and the data storage terminal 120 in the wireless communication system 100 of the present exemplary embodiment will be described with reference to the accompanying drawings. In the following description, the operations of the sensor device 110 and the data storage terminal 120 will be described in detail, and also, a wireless communication method of the present exemplary embodiment will be described.

(Communication Disconnection Operation)

Figure 3:
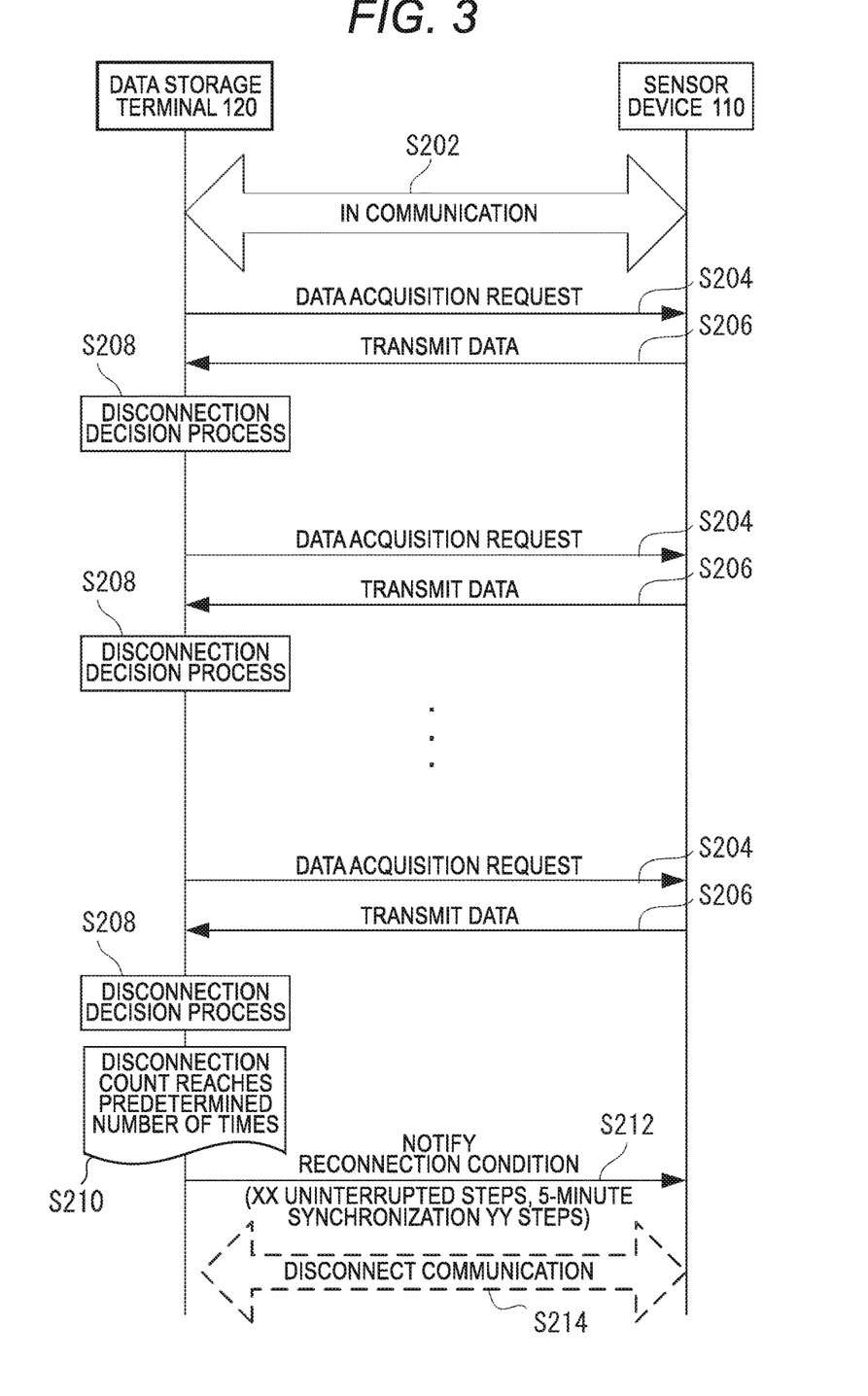
FIG. 3 is a sequence diagram illustrating a communication disconnection operation between the sensor device and the data storage terminal.
Figure 4:
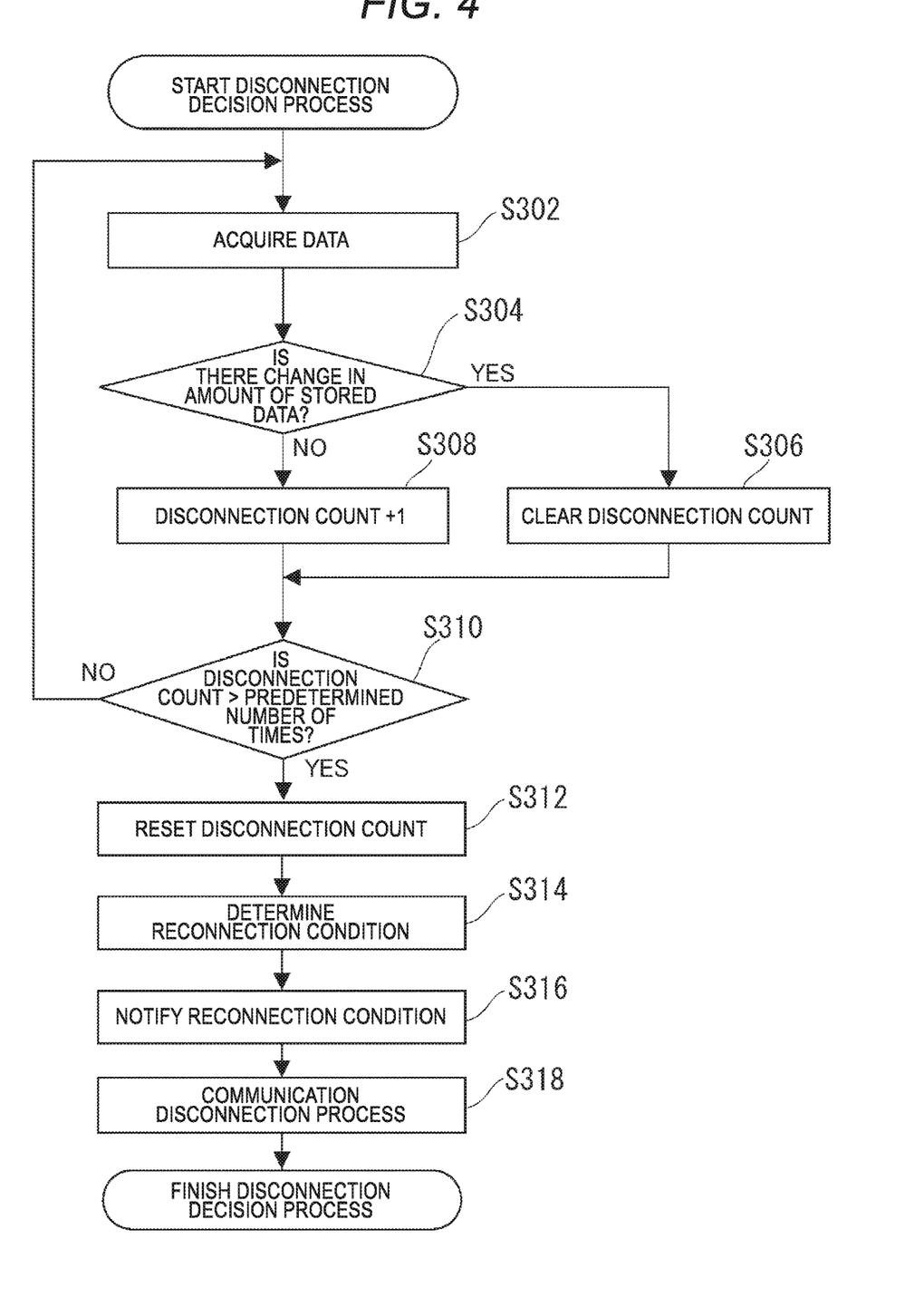
FIG. 4 is a flowchart illustrating a disconnection decision process illustrated in FIG. 3.

FIG. 3 is a sequence diagram illustrating a communication disconnection operation between the sensor device 110 and the data storage terminal 120. FIG. 4 is a flowchart illustrating a disconnection decision process illustrated in FIG. 3, and in particular, illustrates an operation of the data storage terminal 120. In the present exemplary embodiment, although the data storage terminal 120 is configured to perform the disconnection decision process illustrated in FIG. 4, this should not be considered as limiting, and the sensor device 110 may be configured to perform the corresponding disconnection decision process.

As shown in FIG. 3, in the wireless communication system 100 of the present exemplary embodiment, the sensor device 110 and the data storage terminal 120 communicate with each other through short-range wireless communication (step S202). In the meantime, a data acquisition request is transmitted from the data storage terminal 120 to the sensor device 110 (step S204), and, when the data acquisition request is received, the sensor device 110 transmits data of an activity amount to the data storage terminal 120 (step S206). When the data of the activity amount transmitted by the sensor device 110 is received, the data storage terminal 120 performs a disconnection decision process (step S208).

Hereinafter, the disconnection decision process of step S208 will be described. As shown in FIG. 4, the controller 122 of the data storage terminal 120 acquires the data of the activity amount received from the sensor device 110, first, and stores the data in the memory unit 130 (step S302).

Next, the controller 122 determines whether an amount of the stored activity amount data is changed by a predetermined amount or more with reference to the memory unit 130 (step S304). When the amount of the stored activity amount data is changed by the predetermined amount or more (YES at step S304), it may be determined that the activity amount of the user P is great, and the sensor device 110 frequently measures the activity amount. In this case, the controller 122 resets a disconnection count (step S306), and thereafter, determines whether the disconnection count is greater than or equal to a predetermined number of times (step S310).

When the amount of the stored activity amount data is changed by the predetermined amount or more (YES at step S304), the disconnection count is reset (step S306) as described above, and thus the number of disconnection counts is not greater than or equal to the predetermined number of times (NO at S310). Accordingly, the controller 122 resumes step S302 and repeats a subsequent process thereof.

On the other hand, when the amount of the stored activity amount data is not changed by the predetermined amount or more (NO at step S304), it is deemed that the activity amount of the user P is small or the activity is stopped, and it may be determined that the frequency of measurement of the activity amount at the sensor device 110 is low, or the measurement is stopped. In this case, the controller 122 increments the disconnection count (step S308).

The controller 122 determines whether the disconnection count is greater than or equal to the predetermined number of times or not (step S310), and when the number of disconnection counts is less than the predetermined number of times (NO at step S310), repeats the process after step S302.

By repeating the process after step S302 at the data storage terminal 120, the processes at steps S204 to S208 are repeated between the sensor device 110 and the data storage terminal 120 in the wireless communication system 100 as shown in FIG. 3.

When the amount of the stored activity amount data is continuously less than the predetermined amount, the number of disconnection counts reaches the predetermined number of times at the data storage terminal 120 (step S210). That is, the amount of the stored activity amount data (physical quantity) is not changed for a predetermined time.

Referring back to FIG. 4, when the disconnection count is greater than or equal to the predetermined number of times (YES at step S310), the controller 122 of the data storage terminal 120 resets the disconnection count, first (step S312). The controller 122 determines a reconnection condition which is a condition when a reconnection with the sensor device 110 is performed (step S314). The reconnection condition will be described below.

When the reconnection condition is determined, the controller 122 notifies the sensor device 110 of the reconnection condition (step S316). After that, the controller 122 performs a communication disconnection process (step S318), and finishes the disconnection decision process. Accordingly, as shown in FIG. 3, the reconnection condition is notified to the sensor device 110 (step S212), and communication between the sensor device 110 and the data storage terminal 120 is disconnected (step S214).

(Reconnection Operation Based on a Number-of-Steps Count)

Figure 5:
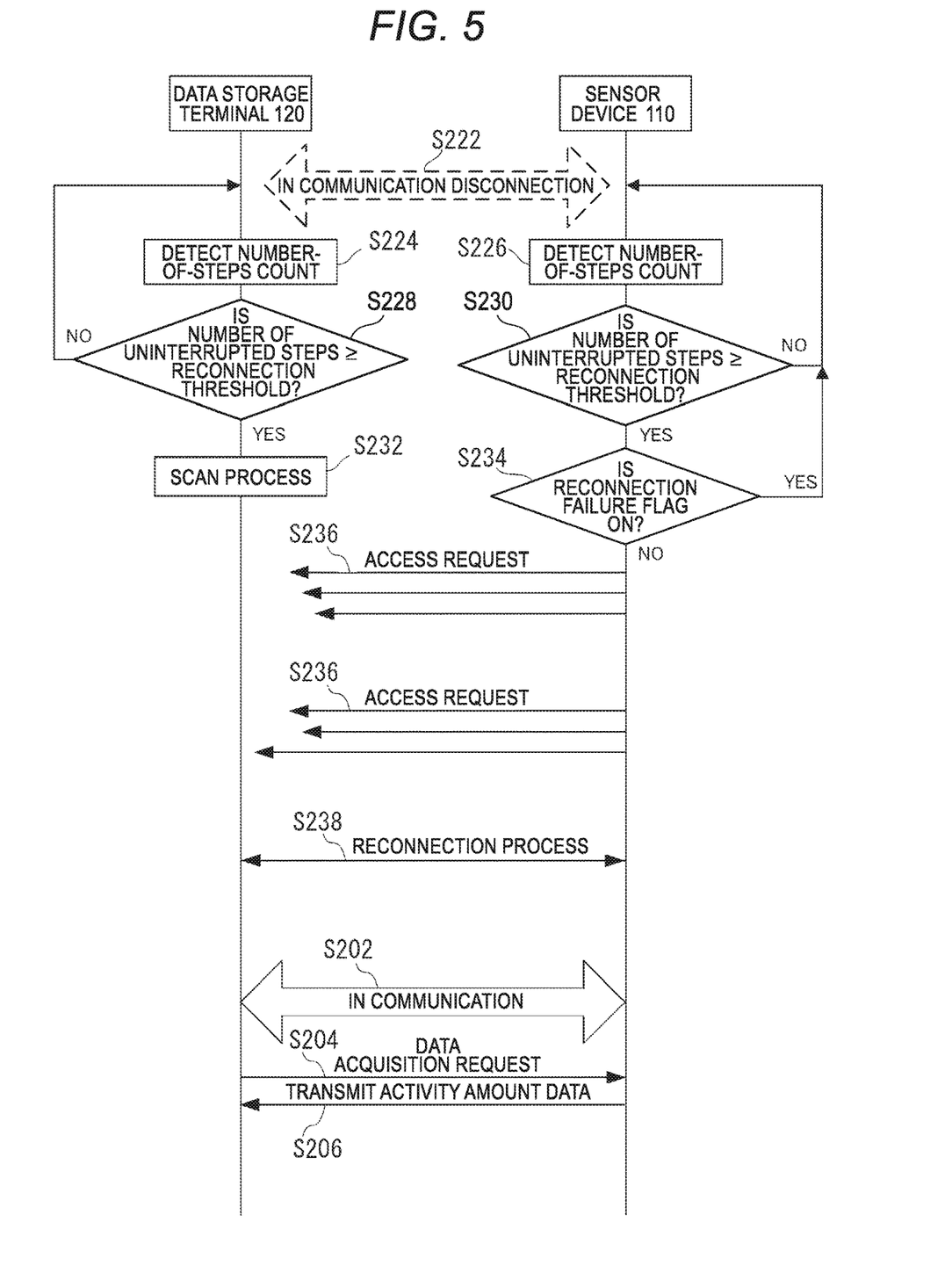
FIG. 5 is a sequence diagram illustrating an example of success of a reconnection operation between the sensor device and the data storage terminal, based on a number-of-steps count.
Figure 6:
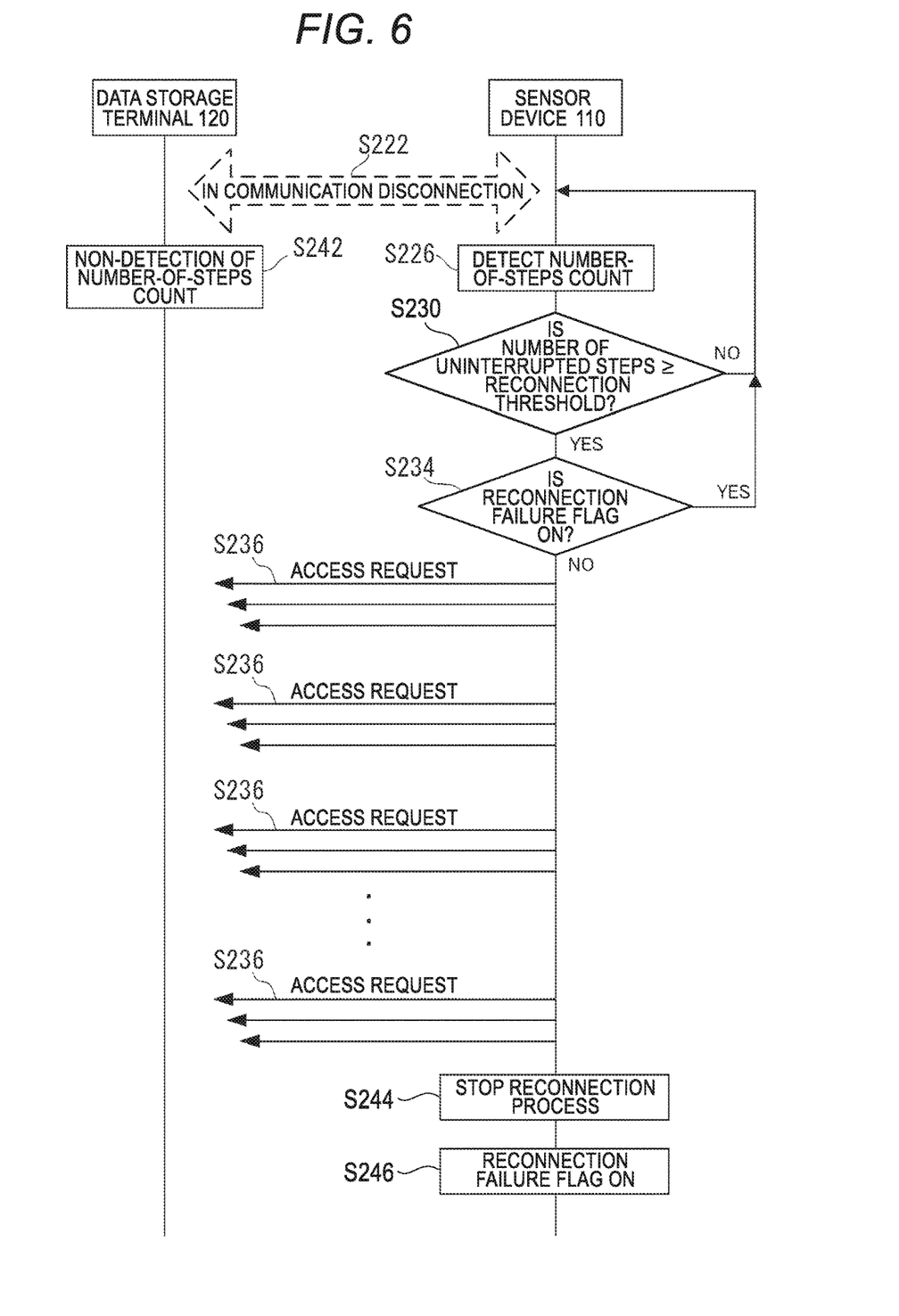
FIG. 6 is a sequence diagram illustrating an example of failure of a reconnection operation between the sensor device and the data storage device, based on a number-of-steps count.

FIGS. 5 and 6 are sequence diagrams illustrating a reconnection operation between the sensor device 110 and the data storage terminal 120, based on the number-of-steps count.

In FIG. 5, a case in which the reconnection operation based on the number-of-steps count succeeds will be described. In FIG. 5, it is assumed that the user P carries the sensor device 110 and the data storage terminal 120 as shown in FIG. 1. In addition, a process overlapping the above-described process will not be described by assigning the same sign.

In the reconnection operation based on the number-of-steps count, both the sensor device 110 and the data storage terminal 120 count the number of steps. In addition, a condition in which the number of steps uninterruptedly counted at the sensor device 110 and the data storage terminal 120 is greater than or equal to a threshold (XX) is referred to as the reconnection condition. The threshold (XX) may be determined appropriately according to an amount of data stored in the data storage terminal 120.

First, an example of success in the reconnection operation based on the number-of-steps count will be described. In FIG. 5, it is assumed that the user P carries both the sensor device 110 and the data storage terminal 120. As shown in FIG. 5, when the number-of-step count is detected at the sensor device 110 and the data storage terminal 120 (step S224, step S226) while communication is disconnected (step S222), the sensor device 110 and the data storage terminal 120 determine whether the number of steps uninterruptedly detected (number of uninterrupted steps) is greater than or equal to the threshold of the reconnection condition (reconnection threshold), respectively (step S228, step S230).

When the number of uninterrupted steps is less than the reconnection threshold (NO at step S228, NO at step S230), the sensor device 110 and the data storage terminal 120 resume step S224 and step S226, and repeat detection of the number-of-step count. On the other hand, when the number of uninterrupted steps at the data storage terminal 120 is greater than or equal to the reconnection threshold (YES at step S228), the controller 122 performs a scan process to search the sensor device 110 (step S232).

When the number of uninterrupted steps at the sensor device 110 is greater than or equal to the reconnection threshold (YES at step S230), the controller 112 determines whether a reconnection failure flag is ON (step S234). The reconnection failure flag is a flag that was generated when the sensor device 110 tried to reconnect to the data storage terminal 120, but failed to reconnect.

When the reconnection failure flag is ON (YES at step S234), the sensor device 110 resumes step S226 and repeats detection of the number-of-steps count. When the reconnection failure flag is OFF (NO at step S234), the sensor device 110 transmits an access request to the data storage terminal 120 (step S236).

The data storage terminal 120 receives the access request, such that the sensor device 110 and the data storage terminal 120 are reconnected with each other (step S238), and communication therebetween is started (restarted) (step S202). Step S204 and step S206 thereafter have been described in FIG. 3, and thus will not be described.

Next, an example of failure in the reconnection operation based on the number-of-steps count will be described in FIG. 6. In FIG. 6, it is assumed that the user P carries only the sensor device 110 and does not carry the data storage terminal 120. In this case, as shown in FIG. 6 while communication is disconnected (step S222), the number-of-steps count is detected at the sensor device 110 (step S226), but the number-of-steps count is not detected at the data storage terminal 120 (step S228).

When the number of uninterrupted steps is greater than or equal to the reconnection threshold, and the reconnection failure flag is OFF, the sensor device 110 transmits the access request to the data storage terminal 120 (step S236). In contrast, the number-of-steps count is not detected at the data storage terminal 120, and thus the scan process illustrated in FIG. 5 is not restarted. Accordingly, the access request is not received at the data storage terminal 120.

In the above-described case, the sensor device 110 repeats transmission of the access request a predetermined number of times, and, when the number of times of transmitting exceeds the predetermined number of times, stops the reconnection process (step S244). The sensor device 110 makes the reconnection failure flag described above be ON (step S246). When the reconnection failure flag is ON, the access request is not performed thereafter (step S234). Accordingly, an unnecessary reconnection process can be avoided in the case where reconnection is not possible, and power consumption in the sensor device 11 can be reduced.

Although not illustrated in FIGS. 5 and 6, the reconnection failure flag may be set to be OFF when a predetermined condition is satisfied. For example, when the cumulative number-of-steps count exceeds a predetermined threshold, the reconnection failure flag may be set to be returned to OFF.

(Reconnection Operation Based on a Reconnection Time)

Figure 7:
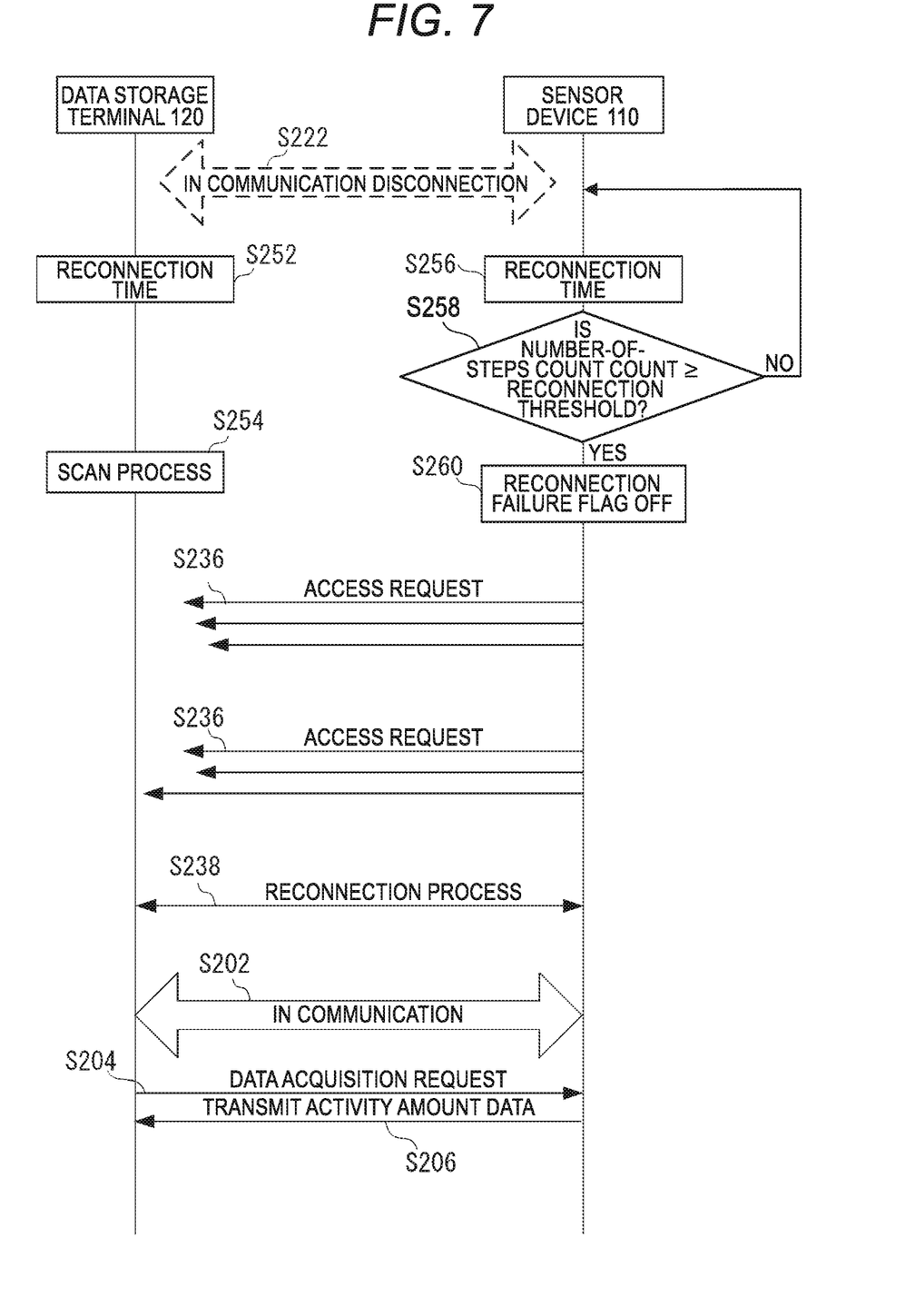
FIG. 7 is a sequence diagram illustrating an example of success of a reconnection operation between the sensor device and the data storage terminal, based on a reconnection time.
Figure 8:
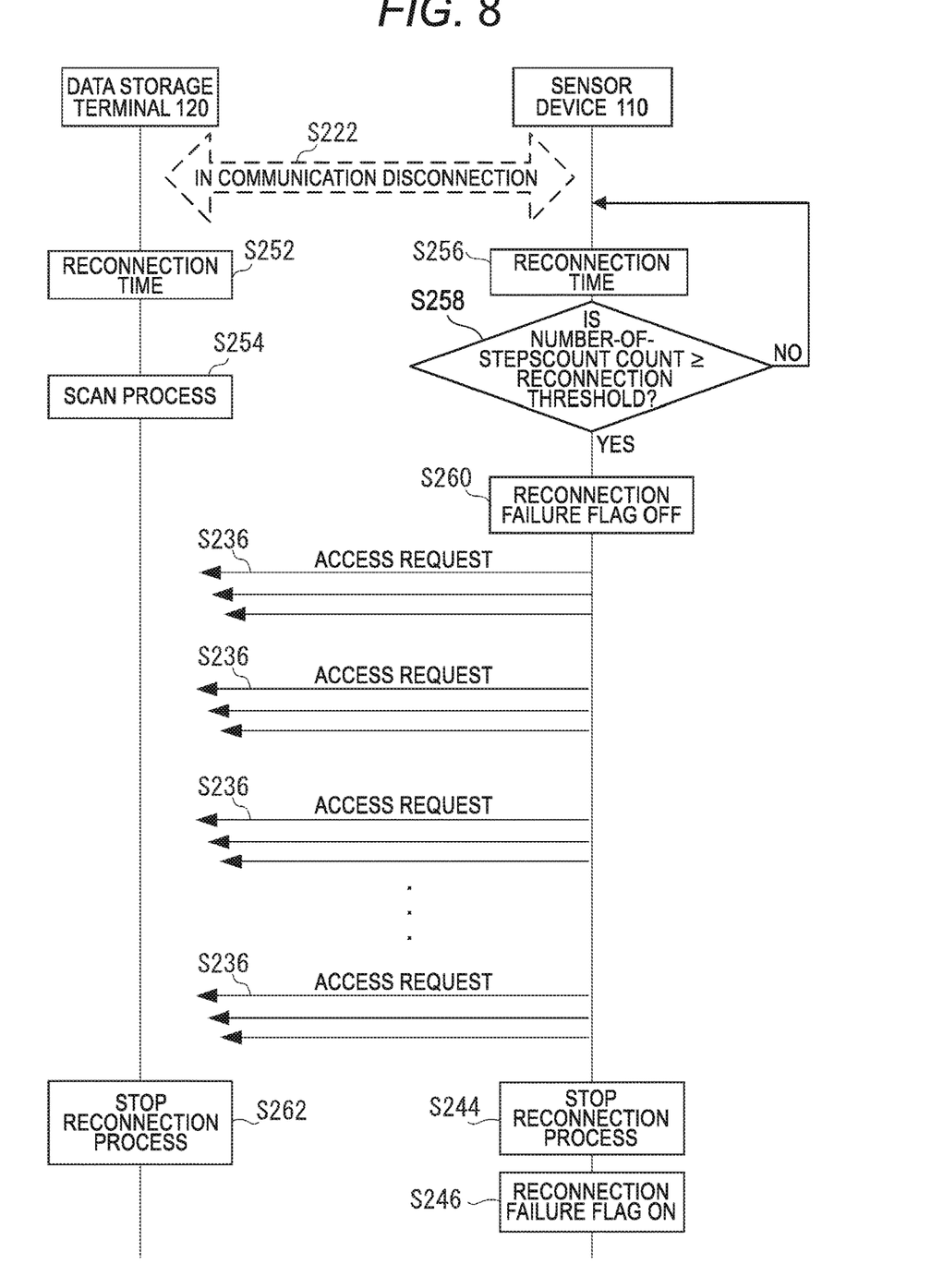
FIG. 8 is a sequence diagram illustrating an example of failure of a reconnection operation between the sensor device and the data storage terminal, based on a reconnection time.

FIGS. 7 and 8 are sequence diagrams illustrating a reconnection operation between the sensor device 110 and the data storage terminal 120, based on a reconnection time. A process overlapping the above-described process will not be described by assigning the same sign.

In FIG. 7, a case where the reconnection operation based on the reconnection time succeeds will be described. In FIG. 7, it is assumed that, at a reconnection time after the user P went out only with the sensor device 110 and came home, the sensor device 110 and the data storage terminal 120 are positioned within a range where short-range wireless communication is possible.

In the reconnection operation based on the reconnection time, the data storage terminal 120 acquires a time at the clock 128, and the sensor device 110 counts the number of steps at the activity amount sensor 114, while acquiring a time at the clock 118. In the data storage terminal 120, a condition in which time reaches a predetermined time (hereinafter, referred to as a reconnection time) is referred to as a reconnection condition. In the sensor device 110, a condition in which time reaches the reconnection time, and also, the number-of-steps count detected after communication disconnection is greater than or equal to the reconnection threshold is referred to as the reconnection condition.

As shown in FIG. 7, when the acquired time reaches the reconnection time in the data storage terminal 120 (step S252), the scan process is performed (step S254).

On the other hand, when the acquired time reaches the reconnection time in the sensor device 110 (step S256), it is determined whether the number-of-steps count detected after communication disconnection is greater than or equal to the reconnection threshold (step S258). When the number-of-steps count is less than the reconnection threshold (NO at step S258), the sensor device 110 resumes step S256 and performs the same process again at the next reconnection time.

When the number-of-steps count is greater than or equal to the reconnection threshold (YES at step S258), the sensor device 110 makes the reconnection failure flag be OFF (step S260), and transmits an access request to the data storage terminal 120 (step S236). The sensor device 110 and the data storage terminal 120 are reconnected with each other (step S238), and communication therebetween is started (re-started) (step S202).

In FIG. 8, an example of failure in the reconnection operation based on the reconnection time will be described. In FIG. 8, it is assumed that the user P goes out with only the sensor device 110, and at the reconnection time, the sensor device 110 and the data storage terminal 120 are not positioned within the range where short-range wireless communication is possible. As shown in FIG. 8, at the reconnection time (step S252), the data storage terminal 120 starts the scan process (step S254).

On the other hand, when the number-of-steps count is greater than or equal to the reconnection threshold in the sensor device 110 at the reconnection time (YES at step S258), the sensor device 110 transmits the access request to the data storage terminal 120 (step S236). However, since the sensor device 110 and the data storage terminal 120 are not positioned within the range where short-range communication is possible, the access request is not received at the data storage terminal 120.

Accordingly, the sensor device 110 repeats the transmission of the access request a predetermined number of times, and, when the number of times of transmitting exceeds the predetermined number of times, stops the reconnection process (step S244). On the other hand, if the data storage terminal 120 does not receive the access request from the sensor device 110 even when a predetermined time elapses from the time the scan process was started, the data storage terminal 120 stops the reconnection process (scan process) (step S262).

As disclosed in Patent Literature 1, a battery (button battery) is normally used as a power source for a sensor device such as an activity meter. Although the sensor device is designed to be operated for several months with the battery, the battery should be replaced when the battery is continuously consumed. Accordingly, in order to reduce the frequency of replacement of the battery in the above-described wireless communication system, power consumption in the sensor device should be reduced.

Since there is no great change in the activity amount during a work such as a desk work, meals, or sleep, the frequency of measurement of the activity amount in the activity meter is reduced. However, when communication with the data storage terminal is performed, power is wastefully consumed. Accordingly, it is considered that short-range wireless communication is disconnected to reduce power consumption, but, when reconnection has not been performed for a predetermined time, the sensor device such as the activity meter may stop transmitting radio waves. Then, when the sensor device and the data storage terminal are reconnected, the user has to perform the reconnection operation of the sensor device.

According to the wireless communication system 100 and the wireless communication method according to the present exemplary embodiment described above, the data storage terminal 120 refers to the data received from the sensor device 110, and, when the amount of stored physical quantity is not changed for a predetermined time, performs the disconnection process. Accordingly, when the change in the physical amount is small, for example, the activity amount of the user is low, and there is no need to update the data frequently, wireless communication can be avoided, and power consumption can be reduced.

When the disconnection process is performed, a reconnection condition is set in the data storage terminal 120, which is one terminal, and is notified to the sensor device 110, which is the other terminal. Accordingly, the two wireless communication devices (the sensor device 110 and the data storage terminal 120) determine whether they satisfy the reconnection condition during communication disconnection, and restart mutual communication when the reconnection condition is satisfied. Accordingly, user's manipulation is not required when the disconnection and the reconnection of short-range wireless communication are performed, and power consumption in the short-range wireless communication can be reduced.

A parameter of the reconnection condition may be appropriately changed according to a time or a degree of change in a physical quantity. When time is used as the reconnection condition, a reconnection time may be determined as described above, or alternatively, a reconnection execution interval such as a predetermined time interval (for example, at 0 minute past the hour or at 12 o'clock, 0 minute every day) may be determined.

A combination of the reconnection operation based on the number-of-steps count and the reconnection operation based on the reconnection time may be used. By combining both operations, the reconnection failure flag may be returned to OFF at the reconnection time even when the reconnection failure flag is ON by the reconnection operation based on the number-of-steps count.

As an effect of the wireless communication system 100 and the wireless communication method of the present exemplary embodiment, an effect of reducing power consumption in the sensor device 110 will be described. A calculation condition is as follows:

Access request transmission interval at the reconnection time: 1 second

The number of times of transmitting the access request at the reconnection time: 10 times (after the access request is transmitted 10 times, the process is stopped if connection is impossible)

Power required when the access request is transmitted: 43.5 [µA/s] (when the access request is transmitted once per 1 second).

Power required at the reconnection time: 25.3 [µA/s] (when radio waves are transmitted once per 1 second), Number of times of radio wave transmission required at the reconnection time: 3 times From the above-described condition, power required for reconnection in the wireless communication system of the present exemplary embodiment is calculated as 510.0 [(µA/times] (43.5 µA×10 times+25.3 µA×3 times).

When short-range wireless communication is always performed as in the related-art wireless communication method, and it is assumed that radio waves are transmitted once per 1 second (effective connection interval is 1 second), power consumption per one day is 2.18 [mAh/day](≅25.3 [µA]× 3600[s]×24[h]). In this case, the life of battery of the sensor device 110 is calculated as 3.2 months (capacity of the button battery 220 [mAh]/2.18 [mAh]÷31 days/month).

When short-range wireless communication between the sensor device 110 and the data storage terminal 120 is disconnected and reconnected as in the wireless communication method of the present exemplary embodiment, and it is assumed that the number of times of reconnection (per 1 hour) is 60 (disconnected at intervals of 1 minute), power consumption per 1 day is 0.73 [mAh/day] (≅510 [µA]×60 [times/hour]×24 [h]). In this case, the life of the battery of the sensor device 110 is calculated 5.9 months (capacity of the button battery 220 [mAh]/0.73 [mAh]÷31 days/month). By applying the wireless communication system and the wireless communication method of the present exemplary embodiment based on this, power consumption of the wireless communication system 100 including the sensor device 110 can be reduced.

While preferred embodiments of this disclosure have been described with reference to the accompanying drawings, this disclosure is not limited to these embodiments. It will be obvious to those skilled in the art that various changes or modifications may be made without departing from the scope described in the claims, and it will be understood that these changes or modifications belong to the technical scopes of this disclosure.

The present application is based on the Japanese Patent Application No. 2016-059054, filed on Mar. 23, 2016, the entire contents of which are incorporated herein by reference.

INDUSTRIAL APPLICABILITY

This disclosure is applicable as a wireless communication system, a communication device, a sensor device, and a wireless communication method, which perform short-range wireless communication.

REFERENCE SIGNS LIST

100: wireless communication system, 110: sensor device, 112: controller, 114: activity amount sensor, 116: communication unit, 118: clock, 120: data storage terminal, 122: controller, 124: acceleration sensor, 126: communication unit, 128: clock, 130: memory unit, P: user

The invention claimed is:

1. A wireless communication system comprising:
    a sensor device configured to perform a short-range wireless communication and detect a first number of steps of a user of the sensor device; and
    a communication device configured to receive data transmitted from the sensor device and detect a second number of steps of the user, wherein
    when the short-range wireless communication is mutually disconnected, one of the communication device and the sensor device notifies an other of the communication device and the sensor device of a reconnection condition,
    after the notifying of the reconnection condition, the communication device and the sensor device mutually disconnect the short-range wireless communication, and
    when the first number of steps and the second number of steps respectively satisfy the reconnection condition, the communication device and the sensor device restart mutually the short-range communication.

2. The wireless communication system according to claim 1, wherein
    when wireless communication is mutually disconnected, the communication device disconnects mutually the wireless communication after notifying the sensor device of the reconnection condition.

3. The wireless communication system according to claim 1, wherein
    the communication device determines the reconnection condition according to a situation of the communication device.

4. The wireless communication system according to claim 1, wherein
    both the communication device and the sensor device include a sensor configured to measure a physical quantity, and
    the reconnection condition is a condition related to a predetermined physical quantity.

5. The wireless communication system according to claim 1, wherein
    the reconnection condition is an indication of a predetermined number of steps of the user.

6. The wireless communication system according to claim 1, wherein
    the communication device is configured to disconnect the wireless communication when an amount of a stored physical quantity is not changed for a predetermined time.

7. A communication device, which receives data transmitted from a sensor device through short-range wireless communication, comprising
    a memory, which stores instructions;

a controller, which control the communication device according to the instructions sored in the memory;

a communication interface, which is controlled by the controller and is used for the short-range wireless communication;

wherein the controller causes the communication device to:

detect a second number of steps of a user of the sensor device;

notify when the short-range wireless communication is mutually disconnected, a predetermined reconnection condition of the sensor device;

disconnect mutually the short-range wireless communication, after notifying the sensor device of a predetermined reconnection condition, and restart mutually a process which enables the communication device to perform the short-range wireless communication, when a first number of steps detected by the sensor, and the second number of steps, respectively satisfy the reconnection condition.

8. A sensor device, which transmits data to a communication device through short-range wireless communication, an activity amount sensor, which measures an activity amount of a user and detects a first number of steps of the user;

a controller, which control the sensor device and receives the activity amount from the activity amount sensor;

a communication interface, which is controlled by the controller and is used for the short-range wireless communication;

wherein the controller causes the sensor device to:

receive, when the short-range wireless communication is mutually disconnected, a notification of a predetermined reconnection condition from the communication device, disconnect mutually the short-range wireless communication, after receiving notification of the predetermined reconnection condition from the communication device; and restart mutually a process which enables the sensor device to perform the short-range wireless communication, when a second number of steps detected by the communication device, and the first number of steps, respectively satisfy the reconnection condition.

9. The wireless communication system according to claim 1, wherein the sensor device is configured to determine a number of steps detected uninterruptedly as the first number of steps after the connection with the communication device is disconnected, and the communication device is configured to determine a number of steps detected uninterruptedly as the second number of steps after the connection with the sensor device is disconnected.

10. The communication device according to claim 7, wherein the sensor device is configured to determine a number of steps detected uninterruptedly as the first number of steps after the connection with the communication device is disconnected, and the communication device is configured to determine a number of steps detected uninterruptedly as the second number of steps after the connection with the sensor device is disconnected.

11. The sensor device according to claim 8, wherein the sensor device is configured to determine a number of steps detected uninterruptedly as the first number of steps after the connection with the communication device is disconnected, and the communication device is configured to determine a number of steps detected uninterruptedly as the second number of steps after the connection with the sensor device is disconnected.

12. The communication device according to claim 7, wherein when wireless communication is mutually disconnected, the communication device disconnects mutually the wireless communication after notifying the sensor device of the reconnection condition.

13. The communication device according to claim 7, wherein the communication device determines the reconnection condition according to a situation of the communication device.

14. The communication device according to claim 7, wherein both the communication device and the sensor device include a sensor configured to measure a physical quantity, and the reconnection condition is a condition related to a predetermined physical quantity.

15. The communication device according to claim 7, wherein the reconnection condition is an indication of a predetermined number of steps of the user.

16. The communication device according to claim 7, wherein the communication device is configured to disconnect the wireless communication when an amount of a stored physical quantity is not changed for a predetermined time.

17. The sensor device according to claim 8, wherein when wireless communication is mutually disconnected, the sensor device receives notification of the reconnection condition from the communication device before the communication device disconnects mutually the wireless communication.

18. The sensor device according to claim 8, wherein both the communication device and the sensor device include a sensor configured to measure a physical quantity, and the reconnection condition is a condition related to a predetermined physical quantity.

19. The sensor device according to claim 8, wherein the reconnection condition is an indication of a predetermined number of steps of the user.

* * * * *